United States Patent Office 3,014,021
Patented Dec. 19, 1961

3,014,021
POLYETHYLENE PROCESS
Gaetano F. D'Alelio, South Bend, Ind., assignor, by mesne assignments, to W. R. Grace & Co., New York, N.Y., a corporation of Connecticut
No Drawing. Filed Oct. 30, 1957, Ser. No. 693,232
8 Claims. (Cl. 260—94.9)

This invention relates to a novel synthesis of ethylene polymers.

More particularly, the invention involves making polyethylenes varying from oils to solids by subjecting ethylene in an inert solvent to the action of a catalyst prepared by subjecting mercury metal to the action of $TiCl_4$, whether or not in the presence of ethylene.

In general, the mercury-containing catalyst of this invention is prepared by treatment of pure Hg metal with $TiCl_4$ at substantially any temperature above room temperature, but preferably between about 130° C. and the boiling point of mercury (356.9° C.).

It has been found that the nature of the catalyst largely determines the nature of the polyethylene polymer, i.e., whether the product contains any substantial amount of solid polymer. As a general rule, if any material amount of unreacted $TiCl_4$ or by-product $HgCl_2$, or added Friedel-Crafts catalyst (such as $AlCl_3$) is present in the reaction mixture along with the treated mercury metal, the polymers resulting are oils of varying degrees of viscosity, and little or no solid polyethylene separates from the oil. Accordingly the nature of the polymer product will be determined largely by the presence or absence of $TiCl_4$ and $HgCl_2$, or added Friedel-Crafts catalyst (such as $AlCl_3$) in, or adherent to, the metal catalyst, or in the reaction mixture.

In forming the catalyst, it is considered essential to discontinue the reaction of $TiCl_4$ with Hg before the Hg is completely consumed, so that the material formed will consist essentially of Hg together with the reaction product of Hg with $TiCl_4$. The nature of this reaction product has not been definitely established, and in fact it appears to vary in composition depending on the conditions of reaction. Thus, the composition of such reaction product formed when Hg is boiled in $TiCl_4$ for a period of 12–48 hours, appears to be different from the composition of the product formed when Hg is heated at higher temperatures, e.g., 200° C. with $TiCl_4$. In each case, however, it appears that some amount of a lower chloride of Ti is formed, i.e., $TiCl_2$ and/or $TiCl_3$, so that my experimental data are consistent with the theory that the catalyst comprises at least Hg plus $TiCl_2$ and/or $TiCl_3$. However, I do not wish to be bound by any theory of operation; it suffices to say that when Hg is heated with $TiCl_4$ in the manner herein described, a highly active catalyst is formed that is capable of polymerizing ethylene.

Depending on conditions, it may often be found desirable to have present in the catalyst a relatively small amount of Friedel-Crafts catalyst, such as unreacted $TiCl_4$ or added $AlCl_3$. Such material, when present in an amount not in excess of say 0.1 to 5% of the total catalyst mass, may operate advantageously to reduce the reaction time somewhat, increase the yield slightly, or keep the average molecular weight of the polymer within the values presently preferred by most consumers. As previously noted, however, when such chlorides including, e.g., $AlCl_3$, $TiCl_4$, $HgCl_2$) are present in material amounts (e.g., 10% or more of the total catalyst mass) they tend to polymerize ethylene to oils and to keep the average molecular weight of the polymer so low that its content of solid polyethylene may be a fraction of the total polymer.

Bearing in mind the above considerations, if it is desired to prepare the catalyst for use in making solid polyethylene with little or no liquid polyethylene, the content of $TiCl_4$ and by-product $HgCl_2$ should be kept low. A suitable procedure for removing $TiCl_4$ and $HgCl_2$ from the catalyst mass comprises heating the Hg-containing mass and vaporizing $HgCl_2$ and $TiCl_4$ from the catalyst in a stream of inert gas, such as nitrogen, argon, or the like, as shown more particularly in Example 2.

In the ethylene polymerization step, the reaction temperature is suitably 20 to 200–250° C., e.g., 125° C. and the reaction pressure can range from fairly low pressures to fairly high pressures, i.e., from atmospheric pressure, e.g., 15 p.s.i., up to 10,000 p.s.i. and even higher. Obviously when it is desired to use a temperature higher than that of the boiling point of the inert solvent selected, the reaction must be carried out under super-atmospheric pressure. Ordinarily, pressures of the order of atmospheric to 500–1000 p.s.i. will give a good yield of product.

As a polymerization menstruum, substantially any inert material can be used which is liquid under the conditions of temperature and pressure employed and which has a solvent action on ethylene. These solvents are well-known to those skilled in the art. Hydrocarbon solvents are preferred, and are preferably substantially free of materials that react with lower chlorides of titanium, e.g., water, $CO_2$, $O_2$, and the like. Suitable solvents include pentane, hexane, heptane, cyclohexane, octane, benzene, xylene, toluene, and the like. The aromatic hydrocarbons are the preferred solvents.

The amount of catalyst is not critical. Relatively small amounts are operable to form relatively large amounts of polyethylene. In general, a practical range is a weight ratio of 0.001–0.1 gram activated mercury per gram of ethylene polymerized. Even larger amounts of catalyst are operable, but present a purification problem as well as an economic problem.

The following examples set forth preferred procedures for polymerizing ethylene with an activated catalyst prepared, as herein explained.

Example 1

30 grams Hg along with 10 ml. $TiCl_4$ and 0.1 g. $AlCl_3$ are heated in a $N_2$ atmosphere at reflux temperature (about 136° C.) in a 100 ml. three-necked flask equipped with stirrer, reflux condenser and $N_2$ inlet. After 48 hours the reaction is terminated and the catalyst mass, as made, is transferred to a 200 cc. stainless steel bomb purged with $N_2$ and containing 50 ml. toluene. (The catalyst mass, as prepared and used, contained substantial amounts of unreacted $TiCl_4$ and by-product $HgCl_2$, both of which were left in it to give a product comprising polyethylene oil.) The bomb is pressurized to about 500 p.s.i. with ethylene and heated to a temperature of about 125° C. During the run the bomb was repressurized with ethylene to maintain a pressure of at least 500 p.s.i. After 24 hours the polymerization reaction is terminated and upon cooling and venting of the bomb a good yield of polymer comprising a substantial amount of oil is obtained.

Example 2

30 grams Hg and 10 ml. $TiCl_4$ are refluxed in a $N_2$ atmosphere in a 100 ml. three-necked flask equipped with stirrer, reflux condenser and $N_2$ inlet. After 48 hours the reaction is terminated and the Hg is filtered off under a $N_2$ atmosphere. The residue is heated at about 150° C. under a $N_2$ atmosphere at a reduced pressure of 10–30 mm. Hg to vaporize substantially all the unreacted $TiCl_4$ and by-product $HgCl_2$ from the residue, leaving a mass comprising mainly $TiCl_2$, $TiCl_3$, and possibly wetted with a trace of $TiCl_4$.

After the vaporization is substantially complete, the Hg removed by filtration is readded to the residue to form a catalytic mass. The catalytic mass is transferred to a 200 cc. stainless steel bomb previously purged with $N_2$ and containing 50 ml. toluene. The bomb is pressurized with ethylene to 500–750 p.s.i. and heated to a temperature of about 125° C. Formation of polymer requires repressurization with ethylene during the polymerization period to maintain the aforementioned polymerization reaction pressure. After 24 hours the polymerization reaction is terminated and upon cooling and venting of the bomb a substantial yield of product comprising high molecular weight solid polyethylene is obtained.

The uses of the polyethylenes of this invention are analogous to the uses of those prepared by prior art procedures. The solid polyethylenes of this invention can be used to make moldings, film, filament, pipe, tubing, extruded articles, and the like, using the same equipment and techniques customary for solid polyethylenes of the prior art. The liquid polymers prepared by the process of this invention are useful as chemical intermediates for alkylation, epoxidation, and the like, by procedures well known to those skilled in the art, and as plasticizers for the solid polymers produced by the procedures herein described, e.g., 1 part of the oil produced in Example 1 can be thoroughly mixed with 10 parts of the solid polymer produced in Example 2 to give a product that is readily extruded into sheet in conventional sheet-extrusion apparatus.

I claim:

1. The method of polymerizing ethylene that includes the step of subjecting ethylene in an inert hydrocarbon solvent at superatmospheric pressure and at a temperature in the range of 20–250° C. to the action of a catalyst prepared by heating together at a temperature of substantially 130–350° C. mercury and titanium tetrachloride in the respective ratio of about 30 g. Hg/10 ml. $TiCl_4$ and consisting essentially of mercury and a reaction product of mercury and $TiCl_4$ in a catalyst:ethylene weight ratio of 0.001–0.1:1.

2. The method according to claim 1 in which the polymerization is conducted in the presence of $TiCl_4$, whereby the resulting polymer comprises liquid polyethylene.

3. The method according to claim 1 in which most of the unreacted $TiCl_4$ and by-product $HgCl_2$ are removed from the catalyst prior to use whereby the ethylene polymer comprises solid polyethylene.

4. The method according to claim 1 in which the pressure is 500–1000 p.s.i.

5. The method according to claim 4 in which the temperature is about 125° C.

6. The method that includes the step of heating at a temperature of substantially 130–350° C. Hg with $TiCl_4$ in the ratio of about 30 g. Hg:10 ml. $TiCl_4$ and recovering a product consisting essentially of Hg metal and a reaction product of Hg and $TiCl_4$.

7. The method according to claim 6 in which the heating step is carried out by boiling Hg with $TiCl_4$ for about 12–48 hours.

8. The method according to claim 6 in which, after the heating step, unreacted $TiCl_4$ and by-product $HgCl_2$ are removed from the reaction product.

References Cited in the file of this patent

UNITED STATES PATENTS

| | | |
|---|---|---|
| 2,827,447 | Nowlin et al. | Mar. 18, 1958 |
| 2,846,427 | Findlay | Aug. 5, 1958 |

FOREIGN PATENTS

| | | |
|---|---|---|
| 777,538 | Great Britain | June 26, 1957 |
| 538,782 | Belgium | Dec. 6, 1955 |
| 1,137,020 | France | Jan. 7, 1957 |

OTHER REFERENCES

Comprehensive Treatise on Inorganic Chemistry, volume VII (J. W. Mellor), published by Longmann, Green & Company, New York, N.Y., 1927 (page 81 relied on).

"Polyethylene" (Raff et al.), published by Interscience Publishers Inc., New York, N.Y., 1955 (page 80 relied on).